(12) United States Patent
Kim et al.

(10) Patent No.: US 10,560,192 B2
(45) Date of Patent: Feb. 11, 2020

(54) TECHNIQUE FOR FOCUSING WAVES ON MOVING OBJECTS

(71) Applicant: The Government of the United States of America, as represented by the Secretary of the Navy, Arlington, VA (US)

(72) Inventors: Jerry T. Kim, Washington, DC (US); Margaret Cheney, Fort Collins, CO (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 30 days.

(21) Appl. No.: 15/911,764

(22) Filed: Mar. 5, 2018

(65) Prior Publication Data
US 2018/0269982 A1   Sep. 20, 2018

Related U.S. Application Data

(60) Provisional application No. 62/466,655, filed on Mar. 3, 2017.

(51) Int. Cl.
*H04B 10/548*   (2013.01)
*H04B 1/74*   (2006.01)
(Continued)

(52) U.S. Cl.
CPC ......... *H04B 10/548* (2013.01); *H04B 1/0475* (2013.01); *H04B 1/74* (2013.01); *H04B 10/2575* (2013.01); *H04B 10/40* (2013.01)

(58) Field of Classification Search
CPC .... H04B 10/25; H04B 10/5161; H04B 10/40; H04B 10/0775; H04B 10/11;
(Continued)

(56) References Cited

U.S. PATENT DOCUMENTS

| | | | |
|---|---|---|---|
| 2009/0076389 A1* | 3/2009 | Jin | G01S 13/904 600/437 |
| 2014/0292507 A1* | 10/2014 | Null | G08B 29/183 340/523 |
| 2018/0020364 A1* | 1/2018 | Wu | H04W 72/1289 |

* cited by examiner

*Primary Examiner* — David C Payne
*Assistant Examiner* — Sarah Hassan
(74) *Attorney, Agent, or Firm* — US Naval Research Laboratory; Richard F. Bis

(57) ABSTRACT

In certain embodiments, a system for transmitting (electromagnetic or acoustic) wave-based signals towards a target includes a plurality of transceivers and a controller. Each transceiver transmits a probe signal towards the target and receives an associated backscatter signal corresponding to reflection of the probe signals from the target. The controller determines, for each transceiver, a Doppler frequency shift and a time delay, modifies each associated backscatter signal based on the corresponding Doppler frequency shift and time delay to generate an associated motion-compensated backscatter signal, and applies time reversal (TR) processing to each motion-compensated backscatter signal to generate an associated motion-compensated TR signal. Each transceiver transmits towards the target a transmission signal based the associated motion-compensated TR signal. In communications systems, the transmission signals are data-modulated versions of the motion-compensated TR signals. In radar and sonar systems, the transmission signals are the motion-compensated TR signals.

18 Claims, 3 Drawing Sheets

(51) Int. Cl.
*H04B 1/04* (2006.01)
*H04B 10/2575* (2013.01)
*H04B 10/40* (2013.01)

(58) Field of Classification Search
CPC .............. H04B 10/112; H04B 10/2513; H04B 10/2575; H04B 10/2581
USPC ........................................... 375/260; 367/90
See application file for complete search history.

TECHNIQUE FOR FOCUSING WAVES ON MOVING OBJECTS

CROSS-REFERENCE TO RELATED APPLICATIONS

This application claims the benefit of the filing date of U.S. provisional application No. 62/466,655, filed on Mar. 3, 2017, the teachings of which are incorporated herein by reference in their entirety.

BACKGROUND

Field of the Invention

The present invention relates to techniques for transmitting acoustic or electromagnetic waves towards targets, such as in radar/sonar tracking and wireless communications.

Description of the Related Art

This section introduces aspects that may help facilitate a better understanding of the invention. Accordingly, the statements of this section are to be read in this light and are not to be understood as admissions about what is prior art or what is not prior art.

It is known to use an iterative technique referred to as time reversal (TR) to focus an electromagnetic or acoustic wave on a stationary or quasi-stationary target. Time reversal allows wave-based signals to converge at the target in both time and space, enabling efficient and reliable communications even in the presence of multi-path signal reflection and/or refraction that would otherwise result in interference that could make such communications difficult. Time reversal has been effective in distributed systems for beamforming onto targets without a priori knowledge of target location. In radar and sonar applications, TR processing can enhance the detection of weakly scattering targets.

FIG. 1 is a flow diagram of a conventional TR technique used to transmit a wave-based communication signal from a stationary transceiver towards a stationary target. In step 102, a probe signal is transmitted from the transceiver towards the target. In step 104, the transceiver receives the resulting backscatter signal corresponding to reflection of the probe signal from the target. In step 106, time reversal processing is applied to the received backscatter signal to generate a TR signal. In step 108, the TR signal is modulated with a data signal to generate a communication signal and, in step 110, the transceiver transmits the communication signal towards the target. This TR technique improves the efficiency and reliability of communications in environments having multi-path sources of interference.

Unfortunately, conventional TR techniques, like the one represented in FIG. 1, cannot be satisfactorily applied to transmit a wave-based signal when there is significant relative motion between a transceiver and a target.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
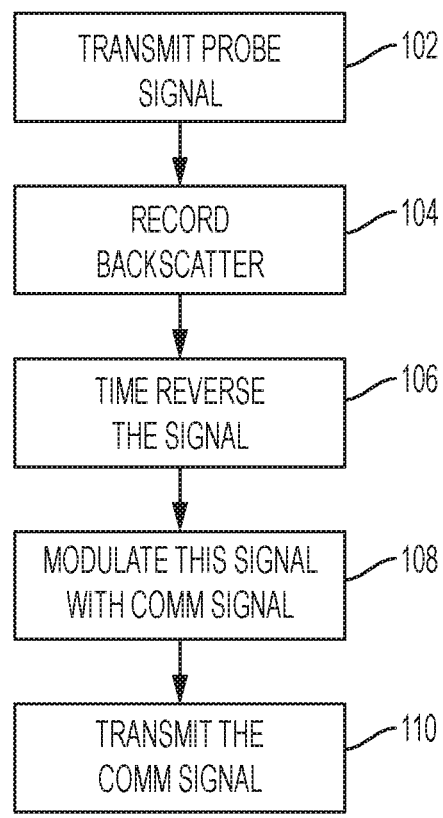
FIG. 1 is a flow diagram of conventional TR processing used to transmit a communication signal from a stationary transceiver towards a stationary target.
Figure 2:
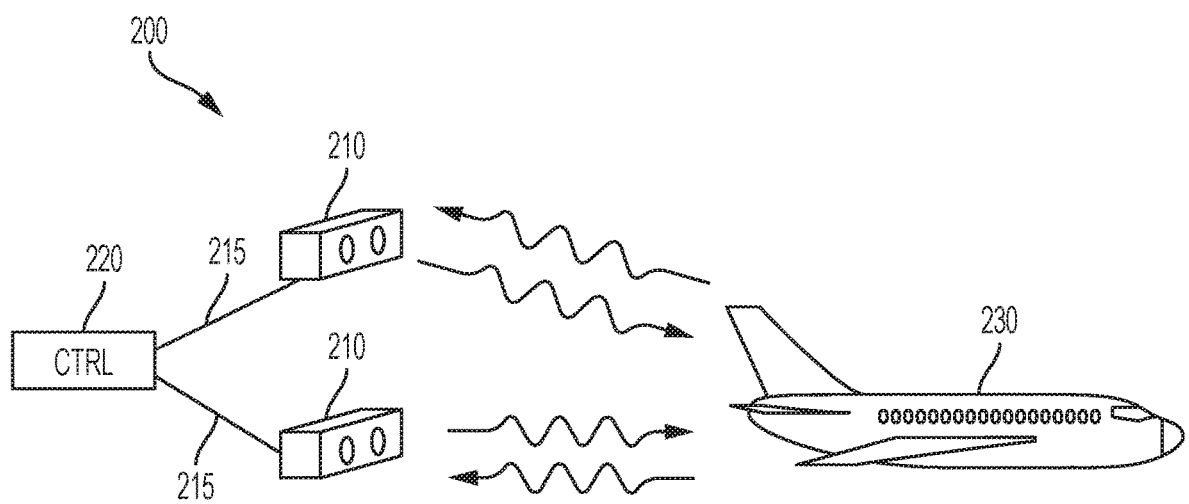
FIG. 2 is a diagram representing a communication system according to one embodiment of the present invention.

FIG. 2 is a diagram representing a communication system 200 according to one embodiment of the present invention. In this particular embodiment, the communication system 200 comprises (at least) two distributed, stationary transceivers 210(1) and 210(2) and a system controller 220 configured to communicate with the transceivers via suitable wired and/or wireless links 215 to control the operations of the transceivers 210 and process the signals received by the transceivers 210. The communication system 200 performs a motion-compensated time reversal (TR) technique to generate and transmit a communication signal from the transceivers 210 towards a target 230 when there is relative motion between at least some of the transceivers and the target. Those skilled in the art will understand that the TR technique may be implemented with more than two transceivers 210 and/or that one or more of the transceivers 210 may also be moving in addition to or instead of the target 230. Although, in this particular implementation, the target 230 is an airplane, the invention can be implemented for any suitable target including land-based, water-based, and even underwater targets.

Figure 3:
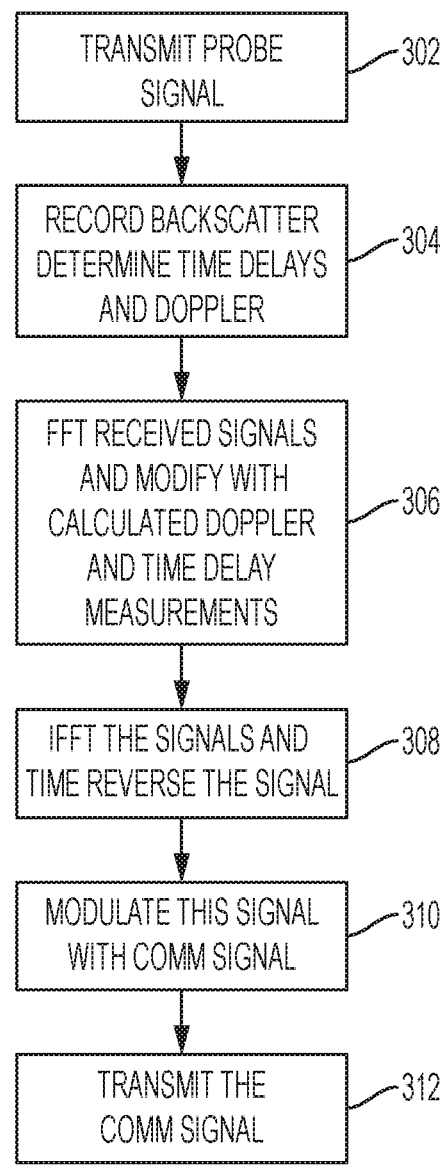
FIG. 3 is a flow diagram of the motion-compensated TR technique performed by the communication system of FIG. 2.

FIG. 3 is a flow digraph of the motion-compensated TR technique performed by the communication system 200 of FIG. 2. In step 302, the transceivers 210 transmit (preferably wideband) probe signals towards the target 230. Depending on the particular implementation, the probe signals may be transmitted concurrently or sequentially. If the probe signals are transmitted concurrently, then the probe signals must be distinguishable from one another. For example, the probe signals may be OFDM (orthogonal frequency division multiplexing) signals that are designed to be orthogonal to one another. Alternatively, the concurrently transmitted probe signals may be wideband signals in non-overlapping frequency bands. Other suitable types of mutually orthogonal signals can also be used. If the probe signals are transmitted sequentially, then the probe signals can be, but do not have to be, mutually orthogonal.

In step 304, each transceiver 210 receives a backscatter signal from the target 230, and the controller 220 uses the received backscatter signal to determine a time delay and a Doppler frequency shift corresponding to the transceiver's probe signal. For a particular transceiver 210, the time delay is a function of the roundtrip distance between the transceiver and the target, while the Doppler frequency shift is a function of the relative velocity between the transceiver and the target. Note that, although each received backscatter signal is a composite backscatter signal resulting from the two probe signals, the time delay and Doppler frequency shift for a particular transceiver 210 represent the time delay and Doppler shift associated with that portion of the received backscatter signal that corresponds to the particular probe signal transmitted from that transceiver. The reason why concurrently transmitted probe signals need to be distinguishable from one another is so that the corresponding portions of the composite backscatter signal will be distinguishable from one another to enable the corresponding time delays and Doppler frequency shifts to be determined.

The time delay for a particular transceiver 210 can be determined by measuring the time that it takes for the corresponding portion of the backscatter signal to be received after the start of the transmission of the transceiver's probe signal. The Doppler frequency shift for a particular transceiver 210 can be determined by measuring the difference between the frequency of the corresponding portion of the backscatter signal and the frequency of the transceiver's probe signal. Those skilled in the art will understand that there are different techniques for determining Doppler frequency shifts, including (without limitation) using phase detectors, LIDAR (light detection and ranging) sensors, or pulse-Doppler radar systems. One can use the transmitted signals themselves by performing Doppler processing on the returned signals in the Fourier domain to extract the Doppler information such as by minimizing a least squared error objective function from the recorded returned signal. Note that, depending on whether the relative velocity between a transceiver and the target is positive or negative, the corresponding Doppler frequency shift can also be positive or negative, where a positive Doppler frequency shift corresponds to the transceiver and the target moving towards each other.

The controller 220 uses the two different time delays and the two different Doppler frequency shifts derived from the two different backscatter signals recorded by the two different transceivers 210 to form a Doppler matrix D according to Equation (1) as follows:

$$D = \begin{bmatrix} e^{-j\omega_{D1}\tau_1/2} & 0 \\ 0 & e^{-j\omega_{D2}\tau_2/2} \end{bmatrix}, \quad (1)$$

where:
$\tau_i$ is the time delay derived from the backscatter signal recorded at transceiver 210($i$);
$\omega_{Di}$ is the Doppler frequency shift derived from the backscatter signal recorded at transceiver 210($i$); and
j is the square root of $-1$.
Note that the size of the Doppler matrix D depends on the number of transceivers, such that, for n transceivers, D will be an (nxn) diagonal matrix.

In step 306, the controller 220 applies a suitable transform, such as a fast Fourier transform (FFT), to convert the time-domain composite backscatter signals to the frequency domain and then modifies the resulting frequency-domain backscatter signals based on the time delays and the Doppler frequency shifts by multiplying the frequency-domain backscatter signals by the Doppler matrix D according to Equation (2) as follows:

$$DS = \begin{bmatrix} e^{-j\omega_{D1}\tau_1/2} & 0 \\ 0 & e^{-j\omega_{D2}\tau_2/2} \end{bmatrix} \begin{pmatrix} S_1(\omega) \\ S_2(\omega) \end{pmatrix} = \begin{pmatrix} S'_1(\omega) \\ S'_2(\omega) \end{pmatrix} = S', \quad (2)$$

where:
S is the signal vector for the frequency-domain backscatter signals;
$S_i(\omega)$ is the frequency-domain backscatter signal for transceiver 210($i$);
$S'_i(\omega)$ is the motion-compensated, frequency-domain backscatter signal for transceiver 210($i$); and
S' is the signal vector for the motion-compensated, frequency-domain backscatter signals.

In step 308, the controller 220 applies a suitable inverse transform, such as an inverse FFT (IFFT), to convert the motion-compensated, frequency-domain backscatter signals back to the time domain to generate motion-compensated, time-domain backscatter signals for the two transceivers and then applies time reversal to those two motion-compensated, time-domain backscatter signals to generate two motion-compensated TR signals. Suitable TR processing is described in the following references, the teachings of all of which are incorporated herein by reference:

C. Prada, J.-L. Thomas, and M. Fink, "The iterative time reversal process: Analysis of the convergence," *J. Acoust. Soc. Am.*, vol. 97, no. 1, pp. 62-71, January 1995;

M. Fink, "Time Reversal of Ultrasonic Fields—Part I: Basic Principles," *IEEE Trans. Ultrason., Ferroelect., Freq. Control*, vol. 39, no. 5, pp. 555-566, September 1992;

M. Cheney, D. Isaacson, and M. Lassas, "Optimal acoustic measurements," *SIAM J. Appl. Math.*, vol. 61, no. 5, pp. 1628-1647, 2001;

M. Cheney and G. Kristensson, "Optimal electromagnetic measurements," *J Electromagnetic Waves and Applications*, vol. 15, no. 10, pp. 1323-1336, 2001; and J. Kim, M. Cheney, and E. Mokole, "Tuning to Resonances with Iterative Time Reversal," *IEEE Transactions on Antennas and Propagation*, Vol. 64, No. 10, pp. 4343-4354, October 2016.

In step 310, the transceivers 210 modulate the TR signals with a common data signal to generate communication signals and, in step 312, the transceivers 210 transmit the communication signals towards the target. This motion-based TR processing improves the efficiency and reliability of communications in environments having multi-path and other similar sources of interference where one or more of the transceivers are moving relative to the target.

Although the invention has been described in the context of system 200 having a system controller 220 in addition to the transceivers 210, in alternative embodiments, some or all of the processing of the controller 220 can be implemented by one or more of the transceivers 210.

The invention has been described in the context of the communication system of FIGS. B and C. In such embodiments, the wave-based signals are (typically) electromagnetic signals, and the reflective target has a receiver that is capable of recovering the data signal embodied in the received communication signals. The invention can also be implemented in the context of other types of systems for transmitting wave-based signals towards a target to compensate for relative motion between one or more of the transceivers and the target. For example, the invention can be implemented in the context of radar or sonar systems that transmit electromagnetic or acoustic waves towards a reflective target that is not required to have a receiver. In those embodiments, the processing of FIG. 3 will be the same except that (i) step 310 is omitted and (ii) step 312 involves the transmission of the motion-compensated TR signals generated in step 308.

Although the invention has been described in the context of TR techniques that convert the time-domain backscatter signals to a frequency domain and then compensate for motion in the frequency domain before converting the motion-compensated backscatter signals back to the time domain, those skilled in the art will understand that the motion compensation can alternatively be performed in the time domain without having to convert the backscatter signals to a frequency domain.

Although the invention has been described in the context of systems with transceivers that have co-located transmitters and receivers, the invention is not so limited. For example, the invention can also be implemented in the context of systems, where one or more of the transceivers have non-co-located transmitters and receivers. As used in the claims, the term "transceiver" covers situations in which the transmitter and receiver of a given transceiver are either co-located or non-co-located.

In certain embodiments, the invention is a method for transmitting wave-based signals towards a target, the method comprising (a) transmitting a probe signal from each of a plurality of transceivers towards the target; (b) receiving, at each transceiver, an associated backscatter signal corresponding to reflection of the probe signals from the target; (c) determining, for each transceiver, a corresponding Doppler frequency shift for the associated backscatter signal; (d) determining, for each transceiver, a corresponding time delay for the associated backscatter signal; (e) modifying each associated backscatter signal based on the corresponding Doppler frequency shift and the corresponding time delay to generate an associated motion-compensated backscatter signal; (f) applying time reversal (TR) processing to each associated motion-compensated backscatter signal to generate an associated TR signal; and (g) transmitting, from each transceiver, an associated transmission signal based the associated TR signal towards the target.

In certain embodiments, the invention is a system for transmitting wave-based signals towards a target, the system comprising a plurality of transceivers and a controller configured to control operations of the transceivers. Each transceiver is configured to transmit a probe signal towards the target and receive an associated backscatter signal corresponding to reflection of the probe signals from the target. The controller is configured to determine, for each transceiver, a corresponding Doppler frequency shift and a corresponding time delay for the associated backscatter signal. The controller is configured to modify each associated backscatter signal based on the corresponding Doppler frequency shift and the corresponding time delay to generate an associated motion-compensated backscatter signal. The controller is configured to apply time reversal (TR) processing to each associated motion-compensated backscatter signal to generate an associated TR signal, wherein each transceiver is configured to transmit an associated transmission signal based the associated TR signal towards the target.

In certain of the above embodiments, each associated transmission signal is the associated TR signal.

In certain of the above embodiments, each associated transmission signal is a radar signal.

In certain of the above embodiments, each associated transmission signal is a sonar signal.

In certain of the above embodiments, each associated transmission signal is a communication signal generated by modulating the associated TR signals based on a data signal.

In certain of the above embodiments, step (e) comprises (e1) converting each backscatter signal from a time domain to a frequency domain; (e2) modifying each backscatter signal in the frequency domain based on the corresponding Doppler frequency shift and the corresponding time delay to generate a modified backscatter signal in the frequency domain; and (e3) converting each modified backscatter signal from the frequency domain to the time domain.

In certain of the above embodiments, step (e2) comprises (e2i) forming a Doppler matrix based on the Doppler frequency shifts and the time delays corresponding to the backscatter signals; and (e2ii) multiplying the backscatter signals in the frequency domain by the Doppler matrix.

In certain of the above embodiments, the Doppler matrix is a diagonal matrix given by:

$$D = \begin{bmatrix} \ddots & \cdots & 0 \\ \vdots & e^{-j\omega_{Di}\tau_i/2} & \vdots \\ 0 & \cdots & \ddots \end{bmatrix},$$

where $\tau_i$ is the time delay associated with the backscatter signal recorded at the $i^{th}$ transceiver; $\omega_{Di}$ is the Doppler frequency shift associated with the backscatter signal recorded at the $i^{th}$ transceiver; and j is the square root of −1.

In certain of the above embodiments, step (a) comprises the transceivers concurrently transmitting the probe signals, wherein the probe signals are mutually orthogonal.

In certain of the above embodiments, step (a) comprises the transceivers sequentially transmitting the probe signals.

Unless explicitly stated otherwise, each numerical value and range should be interpreted as being approximate as if the word "about" or "approximately" preceded the value or range.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system."

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method for transmitting wave-based signals towards a target, the method comprising:
   (a) transmitting a probe signal from each of a plurality of transceivers towards the target;
   (b) receiving, at each transceiver, an associated backscatter signal corresponding to reflection of the probe signals from the target;
   (c) determining, for each transceiver, a corresponding Doppler frequency shift for the associated backscatter signal;
   (d) determining, for each transceiver, a corresponding time delay for the associated backscatter signal;
   (e) modifying each associated backscatter signal based on the corresponding Doppler frequency shift and the corresponding time delay to generate an associated motion-compensated backscatter signal;
   (f) applying time reversal (TR) processing to each associated motion-compensated backscatter signal to generate an associated TR signal; and
   (g) transmitting, from each transceiver, an associated transmission signal based the associated TR signal towards the target, wherein step (e) comprises:
   (e1) converting each backscatter signal from a time domain to a frequency domain;
   (e2) modifying each backscatter signal in the frequency domain based on the corresponding Doppler frequency shift and the corresponding time delay to generate a modified backscatter signal in the frequency domain; and
   (e3) converting each modified backscatter signal from the frequency domain to the time domain.

2. The method of claim 1, wherein each associated transmission signal is the associated TR signal.

3. The method of claim 2, wherein each associated transmission signal is a radar signal.

4. The method of claim 2, wherein each associated transmission signal is a sonar signal.

5. The method of claim 1, wherein each associated transmission signal is a communication signal generated by modulating the associated TR signals based on a data signal.

6. The method of claim 1, wherein step (e2) comprises:
   (e2i) forming a Doppler matrix based on the Doppler frequency shifts and the time delays corresponding to the backscatter signals; and
   (e2ii) multiplying the backscatter signals in the frequency domain by the Doppler matrix.

7. The method of claim 6, wherein the Doppler matrix is a diagonal matrix given by:

$$D = \begin{bmatrix} \ddots & \cdots & 0 \\ \vdots & e^{-j\omega_{Di}\tau_i/2} & \vdots \\ 0 & \cdots & \ddots \end{bmatrix},$$

where:
- $\tau_i$ is the time delay associated with the backscatter signal recorded at the $i^{th}$ transceiver;
- $\omega_{Di}$ is the Doppler frequency shift associated with the backscatter signal recorded at the $i^{th}$ transceiver; and
- j is the square root of −1.

8. The method of claim 1, wherein step (a) comprises the transceivers concurrently transmitting the probe signals, wherein the probe signals are mutually orthogonal.

9. The method of claim 1, wherein step (a) comprises the transceivers sequentially transmitting the probe signals.

10. A system for transmitting wave-based signals towards a target, the system comprising:
   a plurality of transceivers; and
   a controller configured to control operations of the transceivers, wherein:
   each transceiver is configured to transmit a probe signal towards the target;
   each transceiver is configured to receive an associated backscatter signal corresponding to reflection of the probe signals from the target;
   the controller is configured to determine, for each transceiver, a corresponding Doppler frequency shift for the associated backscatter signal;
   the controller is configured to determine, for each transceiver, a corresponding time delay for the associated backscatter signal;
   the controller is configured to modify each associated backscatter signal based on the corresponding Doppler frequency shift and the corresponding time delay to generate an associated motion-compensated backscatter signal;
   the controller is configured to apply time reversal (TR) processing to each associated motion-compensated backscatter signal to generate an associated TR signal; and
   each transceiver is configured to transmit an associated transmission signal based the associated TR signal towards the target, wherein the controller is configured to:
   convert each backscatter signal from a time domain to a frequency domain;
   modify each backscatter signal in the frequency domain based on the corresponding Doppler frequency shift and the corresponding time delay to generate a modified backscatter signal in the frequency domain; and
   convert each modified backscatter signal from the frequency domain to the time domain.

11. The system of claim 10, wherein each associated transmission signal is the associated TR signal.

12. The system of claim 11, wherein each associated transmission signal is a radar signal.

13. The system of claim 11, wherein each associated transmission signal is a sonar signal.

14. The system of claim 10, wherein each associated transmission signal is a communication signal generated by modulating the associated TR signals based on a data signal.

15. The system of claim 10, wherein the controller is configured to:
   form a Doppler matrix based on the Doppler frequency shifts and the time delays corresponding to the backscatter signals; and
   multiply the backscatter signals in the frequency domain by the Doppler matrix.

16. The system of claim 15, wherein the Doppler matrix is a diagonal matrix given by:

$$D = \begin{bmatrix} \ddots & \cdots & 0 \\ \vdots & e^{-j\omega_{Di}\tau_i/2} & \vdots \\ 0 & \cdots & \ddots \end{bmatrix},$$

where:
- $\tau_i$ is the time delay associated with the backscatter signal recorded at the $i^{th}$ transceiver;
- $\omega_{Di}$ is the Doppler frequency shift associated with the backscatter signal recorded at the $i^{th}$ transceiver; and
- j is the square root of −1.

17. The system of claim 10, wherein the transceivers are configured to concurrently transmit the probe signals, wherein the probe signals are mutually orthogonal.

18. The system of claim 10, wherein the transceivers are configured to sequentially transmit the probe signals.

* * * * *